E. FUCHS.
CONDIMENT HOLDER.
APPLICATION FILED JUNE 7, 1911.
1,033,688.
Patented July 23, 1912.
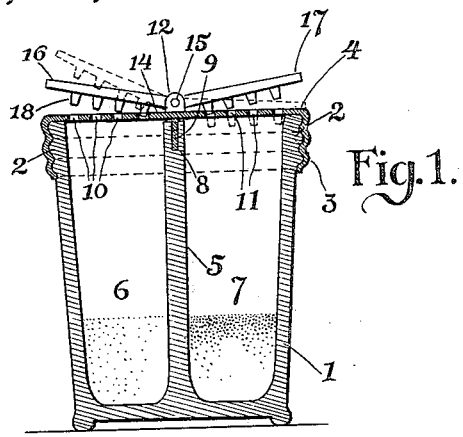
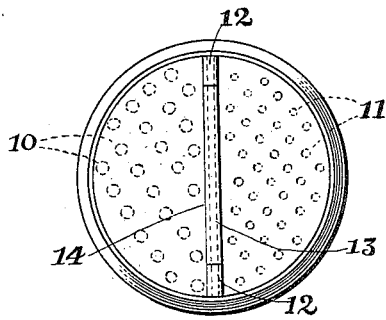
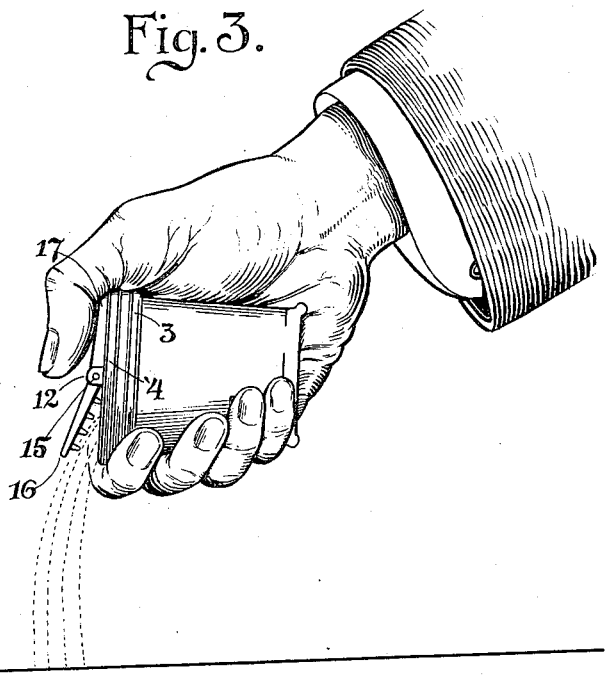
Inventor
ERNESTO FUCHS

UNITED STATES PATENT OFFICE.

ERNESTO FUCHS, OF GUADALAJARA, MEXICO.

CONDIMENT-HOLDER.

1,033,688.  Specification of Letters Patent.  Patented July 23, 1912.

Application filed June 7, 1911. Serial No. 631,773.

*To all whom it may concern:*

Be it known that I, ERNESTO FUCHS, a citizen of the United States, residing at Guadalajara, in the State of Jalisco, Mexico, have invented new and useful Improvements in Condiment-Holders, of which the following is a specification.

This invention relates to condiment holders and particularly to a holder for containing salt and pepper, objects of the invention being to provide a holder with a plurality of non-communicating compartments which are adapted to contain the salt and the pepper, and a valve member for singly closing the compartments when the device is shaken so as to allow the distribution of but a single substance.

Another object of the invention is to provide a perforated cover member for the holder and to provide means on the valve member for cleaning the perforations in the cover member to prevent clogging thereof on the distribution of the substance.

Another object of the invention is to provide means to effect a perfect seal between the separate compartments of the holder so as to prevent the substance of one compartment from mixing with the substance of the adjacent compartment.

Another object of the invention is to provide a valve member which will act as a deflector when the valve is open during the act of distributing the substance.

In the drawing, forming a portion of this specification and in which like numerals of reference indicate similar parts in the several views: Figure 1 is a vertical section through the condiment holder. Fig. 2 is a top plan view thereof. Fig. 3 is a side view of the holder showing the same in the hand of the user and illustrating the manner of using the same for distributing a single substance.

The condiment holder comprises a receptacle 1 which may be constructed of glass, porcelain, metal or any material which may be found most suitable for the purpose, and as illustrated, the receptacle is of cylindrical configuration in cross section and is exteriorly threaded, at 2, to receive the correspondingly threaded flange 3 of the cover member 4. A partition 5 which preferably forms an integral part of the receptacle divides the latter into non-communicating compartments 6 and 7. This partition is preferably provided in its upper edge with a groove 8 in which is fitted an elastic strip of material 9 against which the underside of the cover 4 bears when the cover is in a closed position. The provision of the strip 60 is such as to form an effective seal between the compartments 6 and 7 so as to positively prevent the substance in one compartment from entering into and mixing with the substance of the adjacent compartment.

The holder is designed especially for the reception of salt and pepper and in view thereof, only two compartments are illustrated, it being understood, however, that any suitable number of compartments may be provided according to the use to which the holder is placed. Over the compartment 6, the cover 4 is provided with relatively large perforations 10 to permit of a free passage of the salt therethrough. Over the compartment 7 the cover is provided with similar smaller perforations 11 through which the pepper may freely pass. It will of course be understood, however, that the perforations 10 and 11 may be of the same size as this forms no particular portion of the invention. The cover member 4 is provided with spaced knuckles 12 between which the central knuckle 13 on the combined valve and cleaning member 14 is fitted. A pintle 15 extends through the knuckles 12 and 13 so as to permit the said combined valve and cleaning member to be freely rocked thereon. The member 14 is provided with upwardly diverging actuating portions 16 and 17, each portion being of an inwardly increasing thickness so that the central part of the member forms a counterbalancing portion to normally hold the parts 16 and 17 in open positions. These parts 16 and 17 are disposed immediately above the compartments 6 and 7 respectively, and each has formed thereon on its underside a plurality of pointed cleaning devices 18.

When using the device the operator presses on one of the manipulating portions 16 and 17 of the member 14 so as to actuate the latter and cause the required portion thereof to assume an open position as shown in dotted lines in Fig. 1 and in full lines in Fig. 3. With particular reference to Fig. 1 of the drawing, it will be seen that when the member 14 is actuated so as to open the portion 16 the adjacent companion portion 17 of the member will assume its full closed position, the cleaning devices 18 thereon being extended into the perforations 11 of the cover so as to thoroughly clean the same as will be understood. When the member 14 is actuated so as to permit the substance from one compartment to be distributed and to cut off the discharge of the substance of the adjacent compartment, that portion of the member 14 which assumes an open position will serve as a deflector to direct the distributed substance in the proper course. While the cover 4 as described is threadedly connected with the receptacle 1, it is obvious that any suitable well known means may be employed for securely fastening the cover in place. In other words, any equivalent fastening means may be utilized in lieu of such threaded connections.

I claim:

A condiment holder comprising a receptacle having a plurality of compartments, a perforated cover for the receptacle, a movable closure arranged exteriorly of the said cover including oppositely diverging portions of inwardly increasing thickness and formed at their point of juncture to provide a support adapted to retain each of the said diverging portions in a normal partly open position, and each of the said portions being adapted to be disposed to move the opposite portion to a full open position.

In testimony whereof I affix my signature in presence of two witnesses.

ERNESTO FUCHS.

Witnesses:
RICHARD C. STARR,
MAX. B. FALK.